United States Patent [19]
Saunders et al.

[11] Patent Number: 5,987,183
[45] Date of Patent: Nov. 16, 1999

[54] IMAGE ACTIVITY DATA COMPRESSION AND DECOMPRESSION METHOD AND APPARATUS

[75] Inventors: Nicholas Ian Saunders; Clive Henry Gillard, both of Basingstoke, United Kingdom

[73] Assignees: Sony Corporation, Tokyo, Japan; Sony United Kingdom Limited, Weybridge, United Kingdom

[21] Appl. No.: 08/903,563

[22] Filed: Jul. 31, 1997

[51] Int. Cl.⁶ .................................................. G06K 9/36
[52] U.S. Cl. ........................ 382/239; 382/243; 382/251; 348/391
[58] Field of Search .................................. 382/232, 236, 382/238, 239, 243, 244, 245, 246, 248, 251; 348/390, 391, 393, 394, 396, 405, 419; 358/426, 261.2; 345/51

[56] References Cited

U.S. PATENT DOCUMENTS

| | | | |
|---|---|---|---|
| 5,121,216 | 6/1992 | Chen et al. | 382/239 |
| 5,333,212 | 7/1994 | Ligtenberg | 382/264 |
| 5,379,355 | 1/1995 | Allen | 382/238 |
| 5,524,067 | 6/1996 | Miyake et al. | 382/239 |
| 5,537,493 | 7/1996 | Wilkinson | 382/240 |
| 5,631,977 | 5/1997 | Koshi et al. | 382/239 |
| 5,657,399 | 8/1997 | Iwabuchi et al. | 382/248 |
| 5,684,896 | 11/1997 | Stone et al. | 382/239 |
| 5,708,509 | 1/1998 | Abe | 382/248 |
| 5,768,431 | 6/1998 | Saunders et al. | 382/236 |
| 5,790,695 | 8/1998 | Suwa | 382/236 |
| 5,802,213 | 9/1998 | Gardos | 382/239 |
| 5,805,737 | 9/1998 | Abe | 382/239 |
| 5,809,201 | 9/1998 | Nagasawa | 386/68 |
| 5,832,128 | 11/1998 | Suzuki | 382/241 |
| 5,838,823 | 11/1998 | Ancessi | 382/279 |

Primary Examiner—Matthew C. Bella
Attorney, Agent, or Firm—Frommer Lawrence & Haug, LLP; William S. Frommer

[57] ABSTRACT

Image data compression apparatus for generating groups of encoded image data representing respective sub-areas of an image, in which the degree of data compression applied to each sub-area is specified at least in part by an attribute value associated with that sub-area, comprises selection logic for selecting the attribute value to be associated with each sub-area of an image; an attribute encoder for encoding the attribute value for each sub-area of the image according to a selected one of a plurality of predetermined sets of attribute codes, different sets of attribute codes being encoded using different respective quantities of data; a comparator for comparing attribute values for a group of the data blocks to detect whether the attribute values for the group of sub-areas could be encoded using a replacement one of said sets of attribute codes requiring a smaller quantity of data; and replacing logic responsive to a detection that the attribute values for the group of sub-areas could be encoded using a replacement set of attribute codes requiring a smaller quantity of data, for replacing the attribute codes from the selected set of attribute codes with corresponding codes from the replacement set of codes.

20 Claims, 9 Drawing Sheets

| AM | No OF BITS AVAILABLE FOR EACH AC |
|---|---|
| 00 | 0 |
| 01 | 1 |
| 10 | 2 |
| 11 | 3 |
FIG. 8
| AC | 6 | 4 | 2 | 0 | 1 | 3 | 5 | 7 |
|---|---|---|---|---|---|---|---|---|
| Q_mod | -14 | -10 | -6 | -2 | 2 | 6 | 10 | 14 |
FIG. 9
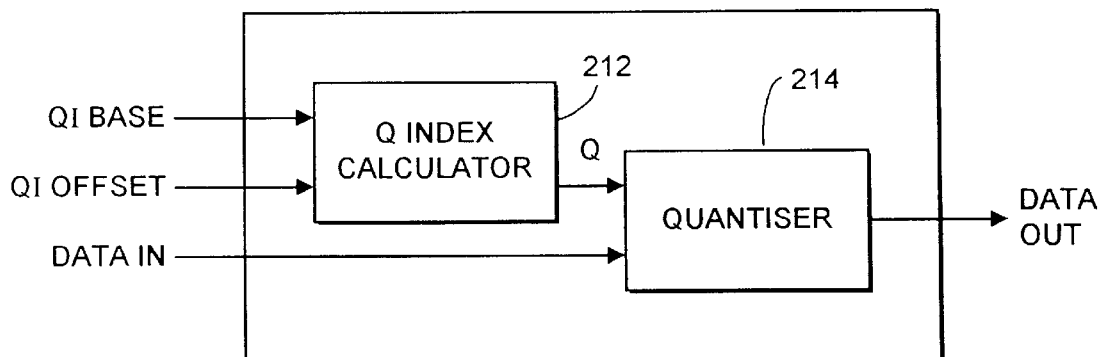
FIG. 10
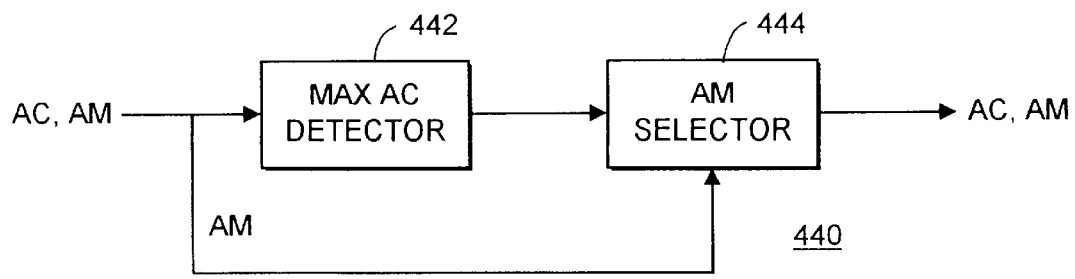
FIG. 11

| INITIAL AM | MAX AC VALUE | OPTIMISED AM |
|---|---|---|
| 11 (3 BIT ACs) | 3 | 10 |
|  | 2 | 10 |
|  | 1 | 01 |
|  | 0 | 00 |
| 10 (2 BIT ACs) | 1 | 01 |
|  | 0 | 00 |
| 01 (1 BIT ACs) | 0 | 00 |

# IMAGE ACTIVITY DATA COMPRESSION AND DECOMPRESSION METHOD AND APPARATUS

BACKGROUND OF THE INVENTION

1. Field of the Invention

This invention relates to apparatus and methods for image data compression and decompression.

2. Description of the Related Art

It is known to take account of a detection of a so-called "activity" level of a block of image pixels in determining an appropriate degree of quantisation to be applied as part of a data compression process for that block of pixels.

GB-A-2 306 832 describes a data compression and decompression system of this type, in which blocks of pixels are subjected to discrete cosine transformation (DCT), quantisation and then entropy encoding for recording on a tape medium. Because the channel data capacity of the tape medium is limited, it is necessary to adjust the degree of compression applied to the image data to ensure that the tape data capacity is not exceeded by generating too much compressed data, while at the same time the available channel capacity is not wasted by generating too little compressed data. Therefore, the degree of quantisation applied to the DCT data is adjusted between blocks or groups of blocks to maintain a substantially constant data rate.

In this previously proposed system, the degree of quantisation is also adjusted between blocks according to the image "activity" of the blocks. In other words, how the block activity is used to determine how heavily individual blocks of an image should be compressed relative to other blocks, within an overall target bit rate for the compressed image.

The block activity is therefore essentially a representation of how noticeable compression artefacts will be in that block, compared to their visibility in other blocks. For example, in a block containing very little image detail (a "smooth" image area) compression artefacts might be more visible in the ultimate compressed and decompressed image than in an area containing a lot of image detail—where the artefacts would be "lost" in the other image detail of the block.

When the compressed image data is encoded, it is necessary to indicate the degree of compression (e.g. the degree of quantisation) applied to each block or group of blocks of the image, so that the correct decompression can be applied to reconstruct the image later. One way of encoding this information is to indicate a "base" quantisation level to be applied to pixels of an area of the image, with variations from that base quantisation level (e.g. in response to the activity assessment) being indicated on a block-by-block basis.

This arrangement requires an amount of header data for each block of the image, just to store the activity level in order to specify the modification to be applied to the "base" quantisation level for that block. If more data is allowed for this purpose, a greater resolution can be used in the activity measurement, but this data overhead has to be balanced against the general requirement in image compression systems to use as little of the available data rate as possible for header and other control data.

It is an object of the invention to provide an improved technique for handling activity codes in data compression and decompression apparatus and methods.

SUMMARY OF THE INVENTION

The invention provides image data compression apparatus for generating groups of encoded image data representing respective sub-areas of an image, in which the degree of data compression applied to each sub-area is specified at least in part by an attribute value associated with that sub-area, the apparatus comprising:

selection logic for selecting the attribute value to be associated with each sub-area of an image;

an attribute encoder for encoding the attribute value for each sub-area of the image according to a selected one of a plurality of predetermined sets of attribute codes, different sets of attribute codes being encoded using different respective quantities of data;

a comparator for comparing attribute values for a group of the data blocks to detect whether the attribute values for the group of sub-areas could be encoded using a replacement one of said sets of attribute codes requiring a smaller quantity of data; and replacing logic responsive to a detection that the attribute values for the group of sub-areas could be encoded using a replacement set of attribute codes requiring a smaller quantity of data, for replacing the attribute codes from the selected set of attribute codes with corresponding codes from the replacement set of codes.

The invention recognises that for the part of an image represented by the group of data blocks, the full range of attribute (e.g. activity) values specified by the set of available attribute codes originally selected for that group of data blocks may not be required.

In preferred embodiments of the invention, this can be detected by pre-scanning the attribute values set for the group of data blocks. If they vary only up to a maximum range of attribute values which would be within the range of a "lower" set of attribute codes (i.e. a set requiring less data), then the codes are replaced by corresponding codes from the replacement set.

In embodiments of the invention, this process may be referred to as activity optimisation, and is preferably carried out separately for the attribute codes appropriate to luminance and the two chrominance data streams.

In a typical embodiment, this so-called activity optimisation (although of course a precise "optimisation" need not take place—a non-optimal improvement may instead result) can save several bits for each sub-area of an image, without the need to apply restrictions to the available range of attribute codes before the codes are allocated to individual data blocks.

In some embodiments, the process of replacing codes with smaller codes could be as simple as omitting one or more most significant bits (MSBs) from a code. In this case, the replacement set could be considered simply as a truncated version of the original set.

The invention also provides a method of image data compression for generating groups of encoded image data representing respective sub-areas of an image, in which a degree of data compression applied to each sub-area is specified at least in part by an attribute value associated with that sub-area, the method comprising the steps of:

(i) selecting an attribute value to be associated with each sub-area of an image;

(ii) encoding the attribute value for each sub-area of the image according to a selected one of a plurality of predetermined sets of attribute codes, different sets of attribute codes being encoded using different respective quantities of data;

(iii) comparing attribute values for a group of the data blocks to detect whether the attribute values for the group of sub-areas could be encoded using a replacement one of the sets of attribute codes requiring a smaller quantity of data; and (iv) in response to a detection that the attribute values for the group of sub-areas could be encoded using a replacement set of attribute codes requiring a smaller quantity of data, replacing the attribute codes from the selected set of attribute codes with corresponding codes from the replacement set of codes.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 8 is a table showing the quantities of data required for different activity modes;

FIG. 9 is a table showing the effect of activity codes on the applied degree of quantisation;

FIG. 10 is a schematic diagram of a quantiser;

FIG. 11 schematically illustrates a part of a bit allocator;

FIG. 13 illustrates the data format of a sync block.

DESCRIPTION OF THE PREFERRED EMBODIMENTS

Figure 1:
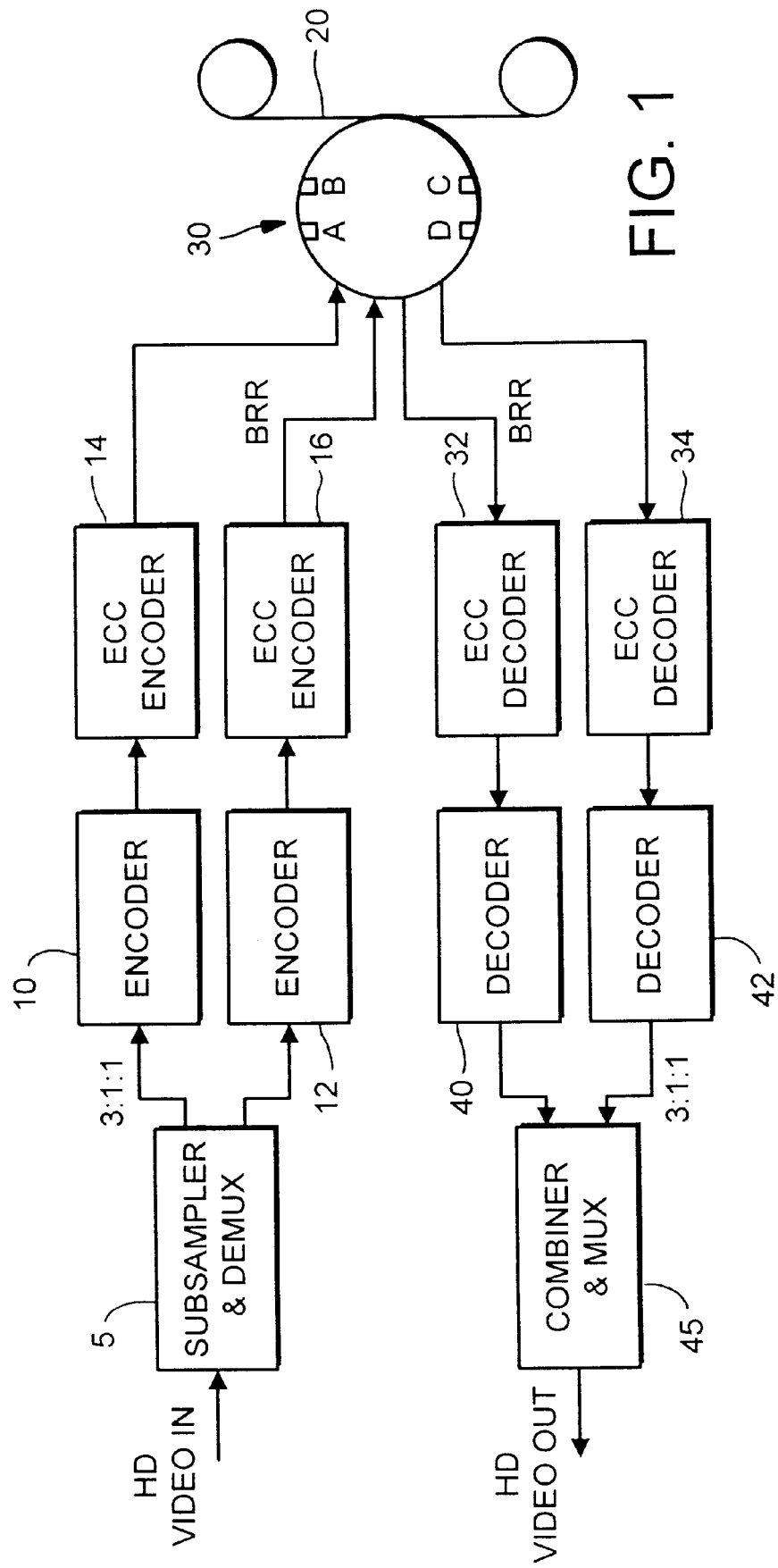
FIG. 1 is a schematic diagram of a bit-rate reducing encoder and a corresponding decoder for use with a magnetic tape channel.

FIG. 1 is a schematic diagram of a tape recording and reproducing system comprising a subsampler and demultiplexer 5, a pair of bit-rate reducing encoders 10, 12, error correction (ECC) encoders 14, 16, a tape channel 20, tape recording and reproducing apparatus (including rotary magnetic heads A . . . D) 30, error correction decoders 32, 34, a pair of corresponding data decoders 40, 42, and a combiner and multiplexer 45.

The subsampler and demultiplexer 5 receives an input 4:2:2 format high definition video signal, subsamples it to a 3:1:1 format and divides the resulting data into two for parallel processing by the encoders 10, 12. The encoders 10, 12 are identical, and each generate a bit-rate reduced (BRR) signal for recording on the tape medium. Similarly, the decoders 40, 42 receive BRR signals reproduced from the tape medium and decode the BRR signals to form respective portions of an output 3:1:1 video signal. The combiner and multiplexer 45 recombines these portions to form the output high definition video signal.

Figure 2:
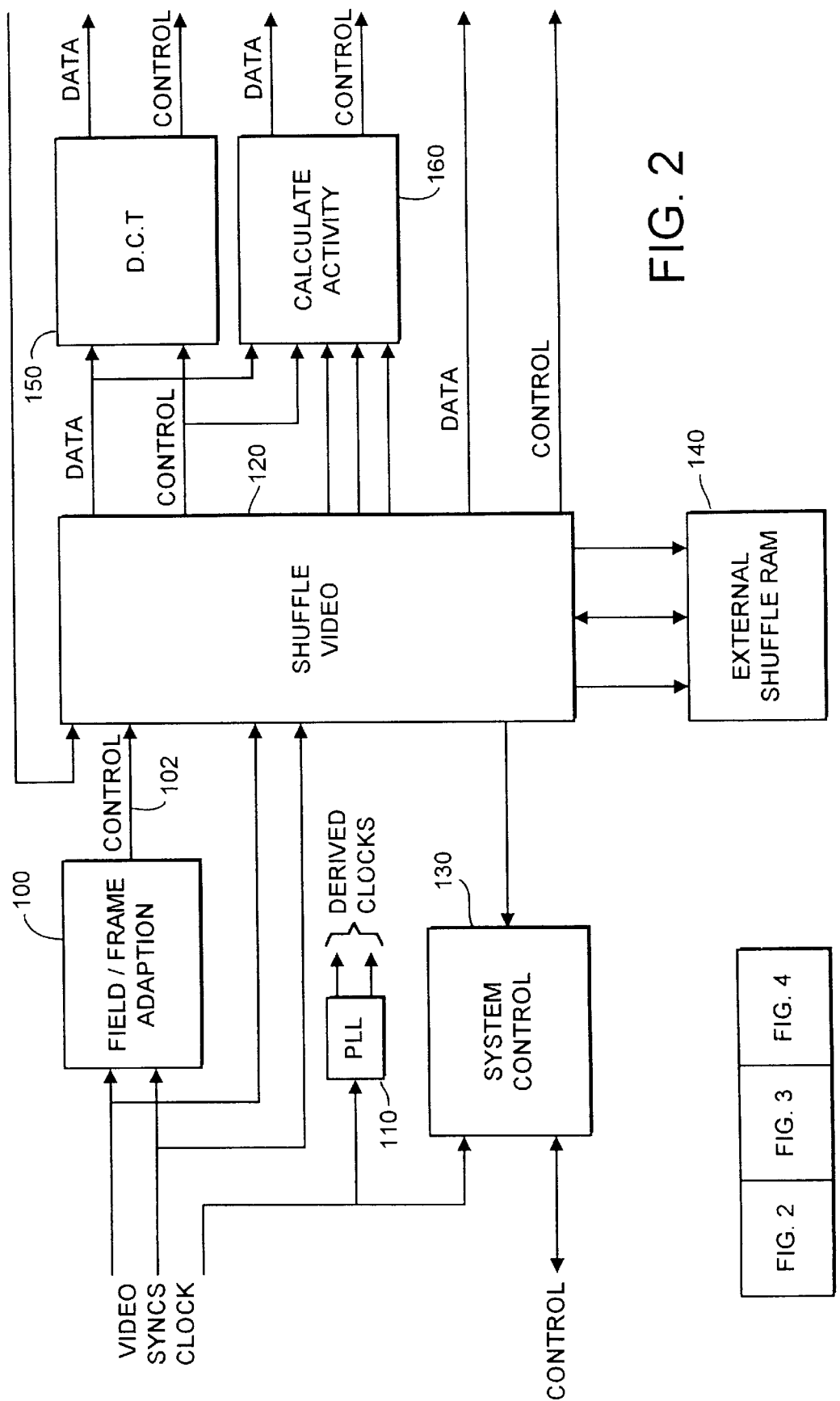
FIGS. 2 to 4 schematically illustrate the bit-rate reducing encoder of FIG. 1.

Referring now to FIG. 2, the input video signal to the encoder, in the so-called 3:1:1 format ($Y_0$ $Y_1$ $Y_2$ $C_b$ $C_r$ etc), a horizontal sync signal and a 46.4 MHz video clock are supplied to a field/frame adaption circuit 100, a phase lock loop 110, a video shuffler 120 and a system controller 130.

The field/frame adaption circuit 100 is used to control switching of the encoder between a frame-based mode of operation and a field-based mode of operation. This switching occurs at a scene change, so that a field-based mode of operation is used for the frame of a scene change.

In order to detect a scene change in the input video signal, the field/frame adaption circuit 100 divides each input field into 16 blocks, each being 300 pixels by 135 lines. The dc level and variance of each block for each field are then calculated as follows:

dc=Σ(pixel value)

variance=Σ(pixel value)$^2$

The variance of the blocks is then normalised as follows:

normalised variance=Σ(pixel value)$^2$/Σ(pixel value)

The dc level and variance for each block of the two fields comprising a single frame are then compared (on a block-by-corresponding-block basis) to detect whether the two fields are considered to be similar. The following relationships are used to make this detection:

(a) if $dc_{fld1}$ × $dc_{lower\ threshold}$ >$dc_{fld0}$
and $dc_{fld1}$ $dc_{upper\ threshold}$ <$dc_{fld0}$
then $dc_{fld1}$ is considered to be similar to $dc_{fld0}$ (b) if $var_{fld1}$ × $var_{lower\ threshold}$ >$var_{fld0}$
and $var_{fld1}$ × $var_{upper\ threshold}$ <$Var_{fld0}$
then $var_{fld1}$ is considered to be similar to $var_{fld0}$ The number of dc and variance blocks that are similar between the two fields are then compared to separate thresholds:

if number_similar$_{dc\ blocks}$>dc block threshold and number_similar$_{var\ blocks}$>var block threshold then the two fields are considered to be part of the same video scene.

The result of this detection is supplied on a control output 102 from the field/frame adaption circuit 100.

The PLL 110 receives the 46.4 MHz clock supplied to the encoder and derives other clock signals required by the encoder apparatus from that clock signal.

The system controller 130 controls the apparatus to operate in the manner described.

The video shuffler 120 receives pixels of the input video signal and stores them temporarily in an external shuffle RAM 140. It then reads blocks of pixels from the external shuffle RAM according to a predetermined shuffle pattern so that blocks of pixels which are adjacent in the image are not read out at adjacent positions in the shuffle pattern.

The reason for this measure is to try to alleviate the effect of data losses (e.g. due to a tape drop-out or similar) on the picture reconstructed by the decoder apparatus. Because pixel blocks which are adjacent in the image are separated from one another in the resulting bit stream (because they are shuffled by the video shuffler 120), a short duration data loss might affect a number of pixel blocks but not their immediate neighbours in the image. This allows data concealment to be used to reconstruct the missing blocks.

The current frame is written to the external RAM while the previous frame is read, in a shuffled manner, from the external RAM.

Figure 3:
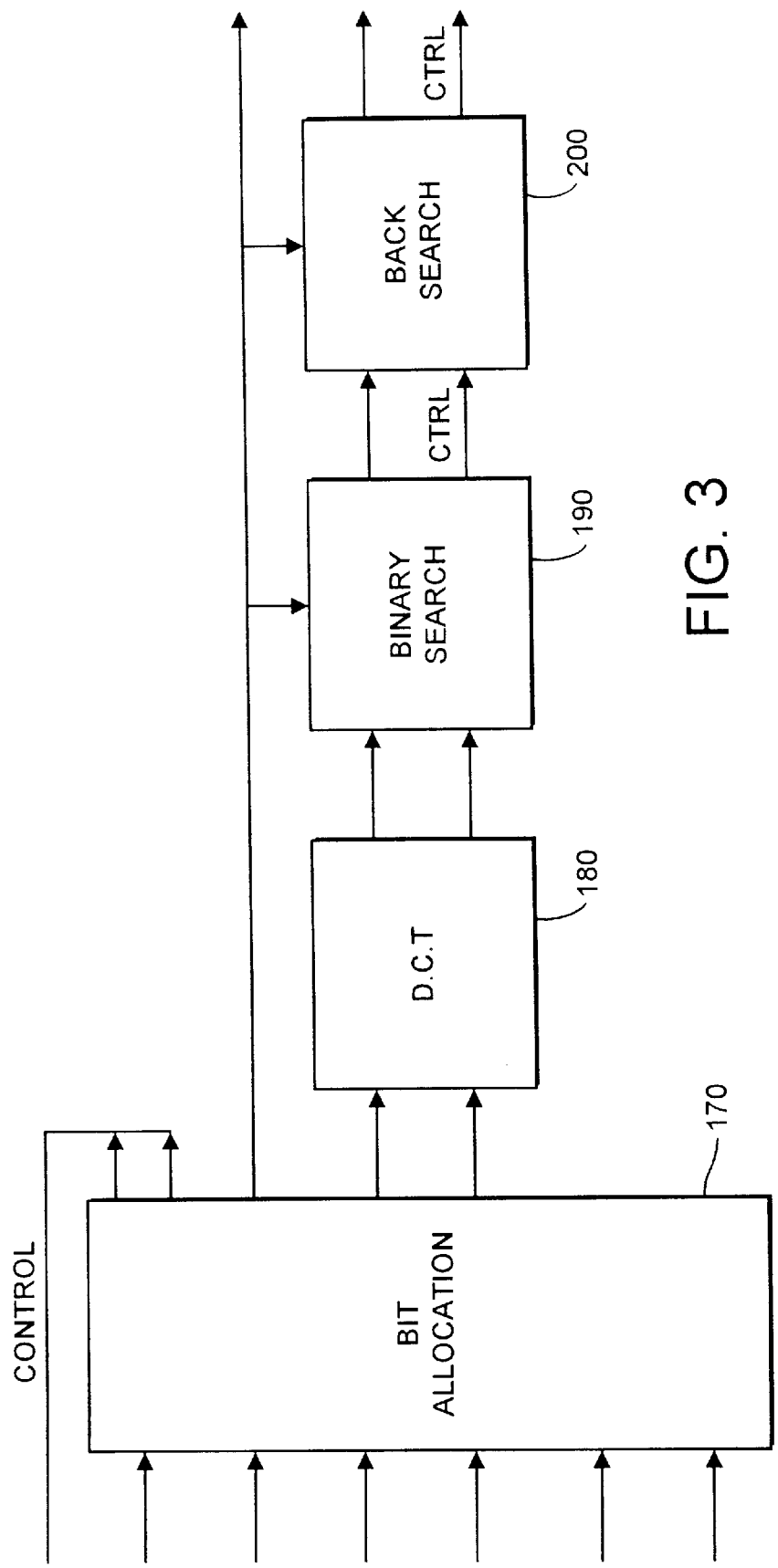

The shuffled data from the video shuffler 120 is supplied to a discrete cosine transform (DCT unit 150), an activity calculator 160 and (referring to FIG. 3) a bit allocator 170.

The DCT unit 150 transform each pixel block supplied from the video shuffler 120 into a corresponding block of DCT coefficients using known techniques. These coefficients are supplied to the bit allocator 170.

The activity calculator 160 generates so-called "activity codes" and corresponding offsets to be applied to the quantisation index for each block of data. These codes specify the so-called activity of each block, assessed according to the following principles:

(i) a block containing more detail (measured for example by the variance of the pixel values within the block) has a higher activity than a block having less detail;

(ii) a block predominantly containing colours associated with skin tones is quantised less harshly (i.e. given a lower notional activity) than a block predominantly not containing such colours;

(iii) a block having a very low or a very high average luminance level is quantised more harshly (i.e. given a higher notional activity) than a block having a mid-range average luminance level (Weber's law). For example, if a block's average luminance level is above 224 or below 32 (in an eight bit system) then a constant value is added to the calculation of the block's activity. If the block's average luminance level is between 32 and 224 then the activity calculation is unaltered.

In general, the activity codes are used to control the later operation of the encoder, so that pixel blocks having a higher activity are subjected to harsher compression, since it is less likely that the viewer would spot compression artifacts in that block when the block is subsequently decompressed. Blocks having a low activity, e.g. relatively "smooth" surfaces, relatively dark areas or areas having colours corresponding to skin tones, are compressed less harshly, since the user is more likely to spot compression artifacts in those areas.

The quantisation index offsets are embedded in the bitstream, whereas the activity codes (which are needed to specify the quantisation offsets to be used on decoding) are supplied separately for possible "optimisation"—see below.

The bit allocator 170 receives DCT data from the DCT encoder 150 and activity data from the activity calculator 160. The bit allocator 170 performs a trial quantization of the DCT data, followed by a trial part of an entropy encoding process.

Using these techniques, the bit allocator calculates the number of bits which would be required to encode each DCT block at one of ten quantization "base" values: 7, 13, 19, 25, 31, 37, 43, 49, 55 and 61, subject to each block's quantisation index offset calculated by the activity calculator. Ultimately, the quantization level for each block is selected to a resolution of 1 (using the scale given above), but for the purposes of the bit allocator 170, the quantization base value is assessed to the nearest 6 on that scale.

At the output of the bit allocator, therefore, a figure derived from the nearest appropriate quantization base level from the selection given above is passed, together with a delayed version of the video data, to a further DCT unit 180, a binary search unit 190 and a backsearch unit 200. This process will be described further below, but in brief, a value 2 greater than the quantisation value giving just over the required bit rate is passed by the bit allocator.

The further DCT unit 180 again calculates DCT coefficients, this time based on the delayed version of the video data.

The binary search unit 190 carries out trial quantizations at quantization levels just above or just below the base quantization level, again modified by the quantisation index offsets associated with each block, to select one value within a range of −3 to +4 with respect to the base quantization level from the bit allocator.

A further trial quantization is carried out by the backsearch unit which tests the quantization level selected by the binary search unit 190, and assesses whether a higher quantization level could be used whilst still obtaining the same or fewer quantisation errors.

Finally, the selected quantization level, and the DCT blocks from the further DCT encoder 180, are supplied to a quantizer 210 where they are quantized according to the selected quantization level. The quantized data are passed to an entropy encoder 220 which generates variable length output data according to the standard principles of entropy encoding, so that more commonly occurring data patterns in the quantized data are encoded using shorter code words.

The data generated by the entropy encoder is then packed into "code blocks" for recording on tape by a data packer 230. The code blocks include header data, entropy-encoded data from a number of DCT blocks, activity codes associated with those blocks and an indication of the quantisation level used in forming the blocks. Error correcting codes are then applied to provide error correction when the code blocks are replayed from the tape. A code block comprises five "sync blocks", where a sync block is the smallest separately recoverable data item recorded on the tape in this system. A sync block is illustrated schematically in FIG. 13 and is described further below.

Figure 5:
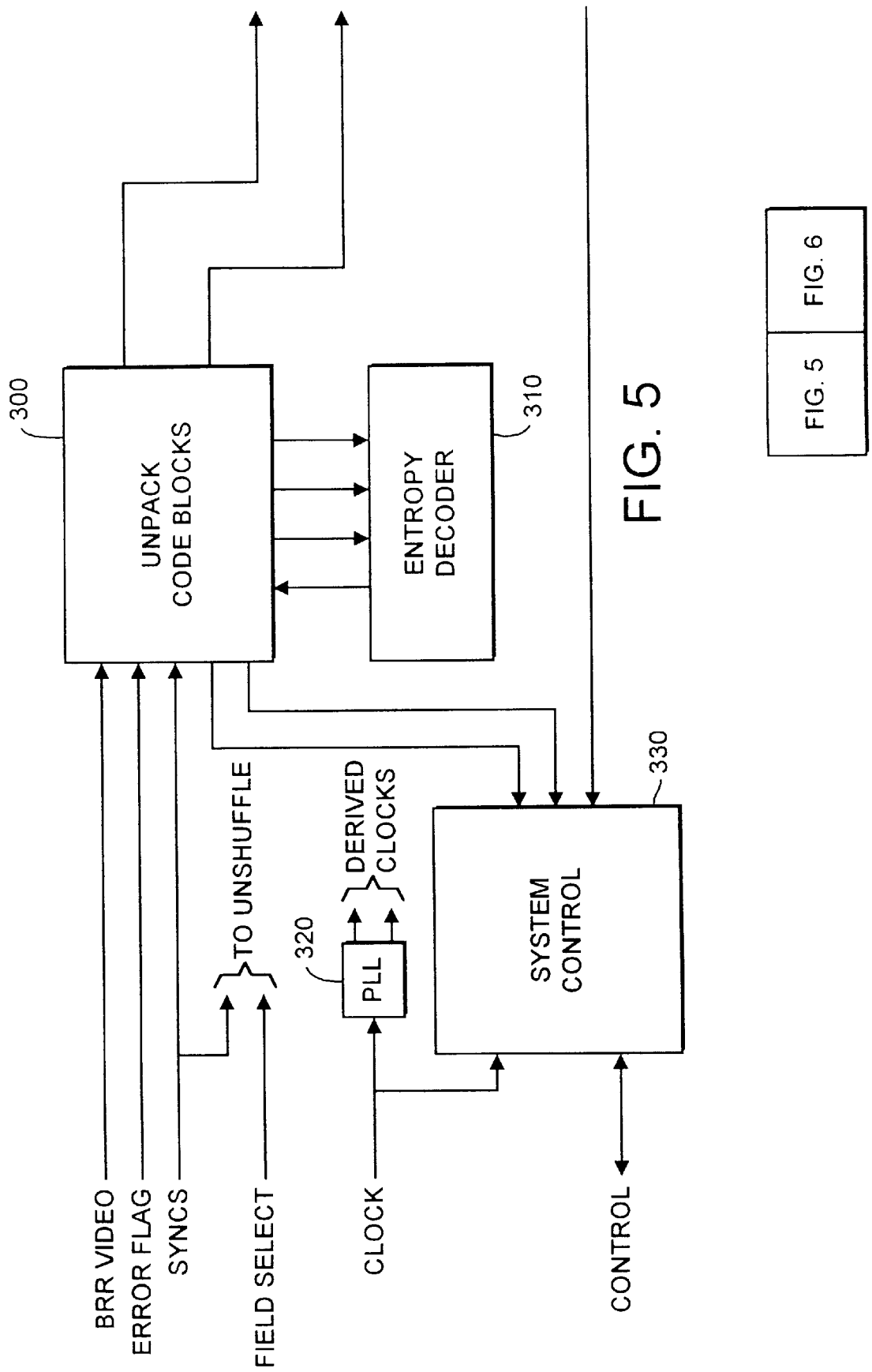
FIGS. 5 and 6 schematically illustrate the corresponding decoder of FIG. 1.
Figure 6:
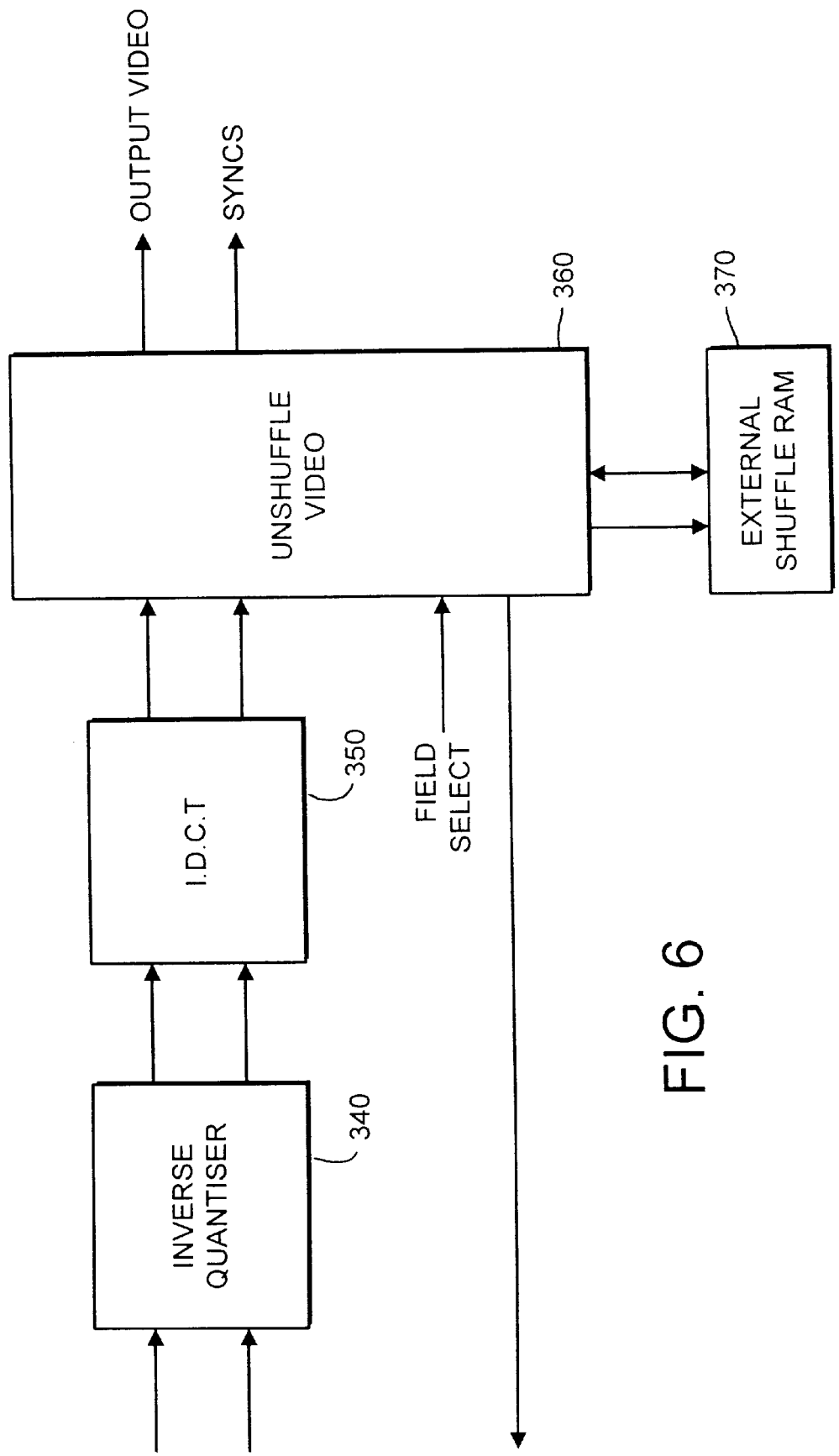

FIGS. 5 and 6 schematically illustrate the structure of the decoder 40 of FIG. 1.

Figure 4:
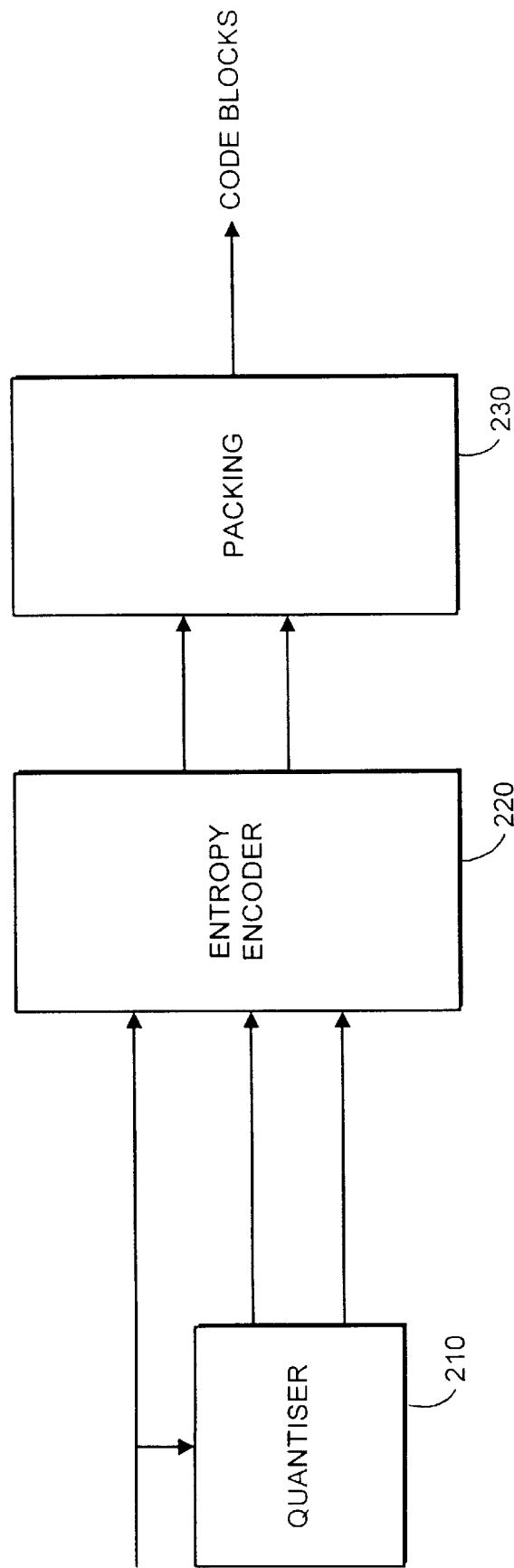

The bit-rate reduced (BRR) video, an error flag indicative of a data error in the BRR signal and horizontal and frame sync pulses are supplied to an unpacker 300. This operates in a complementary manner to the packer 230 of FIG. 4, to unpack individual DCT blocks (as entropy encoded) from the code blocks recovered from the tape. The unpacker forwards the entropy encoded data unpacked from the code blocks to an entropy decoder 310 where the DCT data is recovered.

A phase lock loop 320 receives a clocking signal associated with the input data and derives other clocking signals required by other parts of the decoding apparatus.

A system controller 330 controls the operation of the apparatus as described herein.

Turning now to FIG. 6, the entropy decoded DCT blocks are supplied to an inverse quantizer 340 where an inverse quantizing operation is carried out. The output from the inverse quantizer is supplied to an inverse DCT unit 350 where an inverse DCT operation is performed.

This generates blocks of image data, but in the shuffled order (by virtue of the shuffler 120 on the encoder 10. Therefore, an unshuffler 360 is used to recreate the correct image order of the pixel blocks. This is carried out by writing the pixel data to an external shuffle RAM 370 during one field or frame, and then reading it out in the correct order during the next field or frame. The output of the unshuffler 360 forms the output video signal and an associated sync signal.

Figure 7:
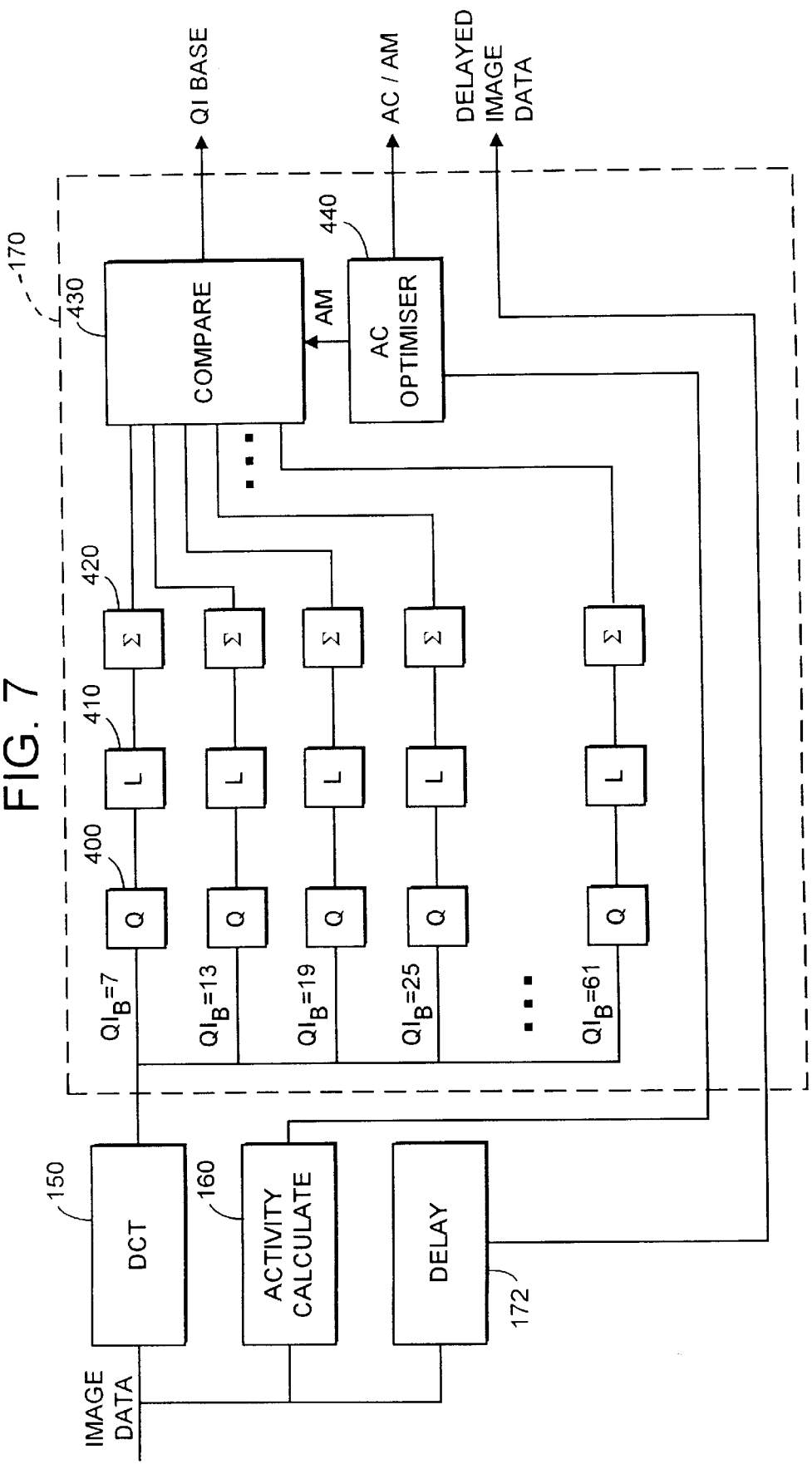
FIG. 7 schematically illustrates a bit allocator in more detail.

Referring now to FIG. 7, the operation of the bit allocator 170 will now be described in more detail.

The bit allocator 170 receives blocks of image data from the shuffler 120, DCT encoded data blocks from the DCT unit 150, and activity codes with an associated activity mode from the system controller. Activity modes and activity codes will be described in detail below with reference to FIGS. 8 and 9.

A delay unit 172 is provided (actually by the shuffler reading data later from the external shuffle RAM) for delaying the image data by the processing time of the bit allocator. Delayed image data is supplied for processing by later stages of the apparatus of FIG. 1, once the trial quantisation process of the bit allocator has been completed.

The DCT blocks are supplied in parallel to a number of processing chains each comprising a trial quantiser 400, a length calculator 410 and a bit summer 420. Each of the processing chains carries out a trial compression of each DCT block according to one of ten quantization "base" values: 7, 13, 19, 25, 31, 37, 43, 49, 55 and 61. The results of each trial quantisation are supplied to the respective length calculator 410. This carries out a part of the processing associated with entropy encoding, in that it calculates the number of bits which would be required to entropy-encode that quantised data. These numbers of bits are summed by a summer for all of the DCT blocks within a code block. As mentioned above, a code block comprises five sync blocks, and a sync block, as illustrated in FIG. 13, is a data unit for recording onto tape, and comprises 9 luminance DCT blocks and 6chrominance DCT blocks (3 Cb; 3 Cr).

After all of the DCT blocks of one code block have been processed in this way, the summed numbers of bits from the ten respective summers 420 are supplied to a comparator 430. This adds the amount of data needed to encode the activity codes for the DCT blocks (see below) to the outputs of the summers 420, and selects that value of the base quantisation level ($QI_{base}$) which gives a quantity of coded data nearest to but under the target size of a code block. That value of $QI_{base}$ is passed to the binary search unit and the backsearch unit for further processing as described above.

In parallel with the above processing, the optimisation of activity codes is being performed.

The apparatus can operate in one of four activity "modes", which determine the amount of data made available to specify the activity level of each DCT block. These activity modes are shown in FIG. 8, and vary from a mode in which no data is made available to specify the activity levels (AM=00) to one in which 3 bits per DCT block are made available (AM=11).

So, in AM=11, there are eight possible activity values which can be encoded by corresponding activity codes (AC). The effect of these activity values on the quantisation level used for the corresponding DCT block is illustrated in FIG. 9. Referring to FIG. 9, it can be seen that in AM=11, the actual quantisation applied to the DCT block can be modified by up to ±14 (on a scale—before modification by image activity —of about 1 to 64).

The initially selected activity mode is set by the user. The actual quantisation index offsets used in the activity mode are recorded onto tape as a look-up table, so that tapes recorded using different sets of offsets can be read by the same decoding apparatus.

In AM=10, two bits are available for each AC, so up to four values can be encoded. These values are not necessarily those shown for AC=0, 1, 2 and 3 in FIG. 9, but can be any values such as ±14 and ±6. Whatever the initially selected AM, a look-up table giving the correct quantisation index offsets to be used under that AM is written to tape—in fact, six times per frame.

Similarly, in AM=01, the available ACs are AC=0 and 1. In AM=00, only AC=0 is available.

The initial AM value is set by the user, and is used by the activity calculator 160 in generating activity codes to be associated with each DCT block. These codes will have 0, 1, 2 or 3 bits depending on the initially selected AM.

FIG. 10 illustrates the final quantiser 210 in more detail, and shows that the quantiser 210 receives the DCT data from the DCT unit 180, a quantisation base value from the backsearch unit 200 and the quantisation index offset (derived from the bitstream) for a current block. The AC and the $QI_{base}$ values are combined in a Q Index calculator 212,
where the addition or subtraction specified for each AC by the table of FIG. 9 is carried out. The resulting quantisation value Q is applied to the DCT data by a quantiser unit 214.

The ACs are not used in the trial quantisation process carried out by the bit allocator 170. This allows the process of so-called AC optimisation to be carried out in parallel to the trial quantisations.

The ACs and the AM are supplied to an AC optimiser 440. The AM may be supplied explicitly or may be implied from the length of the ACs.

The AC optimiser is illustrated in more detail in FIG. 11.

The AC and AM values are received by a maximum AC detector 442 and an AM selector 444. The maximum AC detector detects (for Y, Cb and Cr blocks separately) the maximum AC value for that sync block. This information is passed to the AM selector which detects whether the number of bits required to encode that maximum value is fewer than the number of bits allowed by the current AM, and in fact is within the allocated number of bits of a lower AM. If this is true then the AM selector replaces the initially selected AM for that sync block with a replacement, lower AM Also, the n-bit ACs prepared under the initially selected AM are replaced with m-bit ACs, where m<n. Effectively this is done by the entropy encoder ignoring one or more most significant bits of the ACs.

In fact, although a lower order AM is specified, resulting in a saving of one or more bits per DCT block in recording the ACs, the look-up table used to decode the ACs into quantisation index offsets will be the same as the look-up table for the initially selected AM. So, a two-bit AC under the initially selected AM=10 might well represent a quite different quantisation index offset to the same two bit AC under an AM that has been optimised from AM=11 down to AM=10, because in the latter case the look-up table for AM=11 will still be used.

Figure 12:
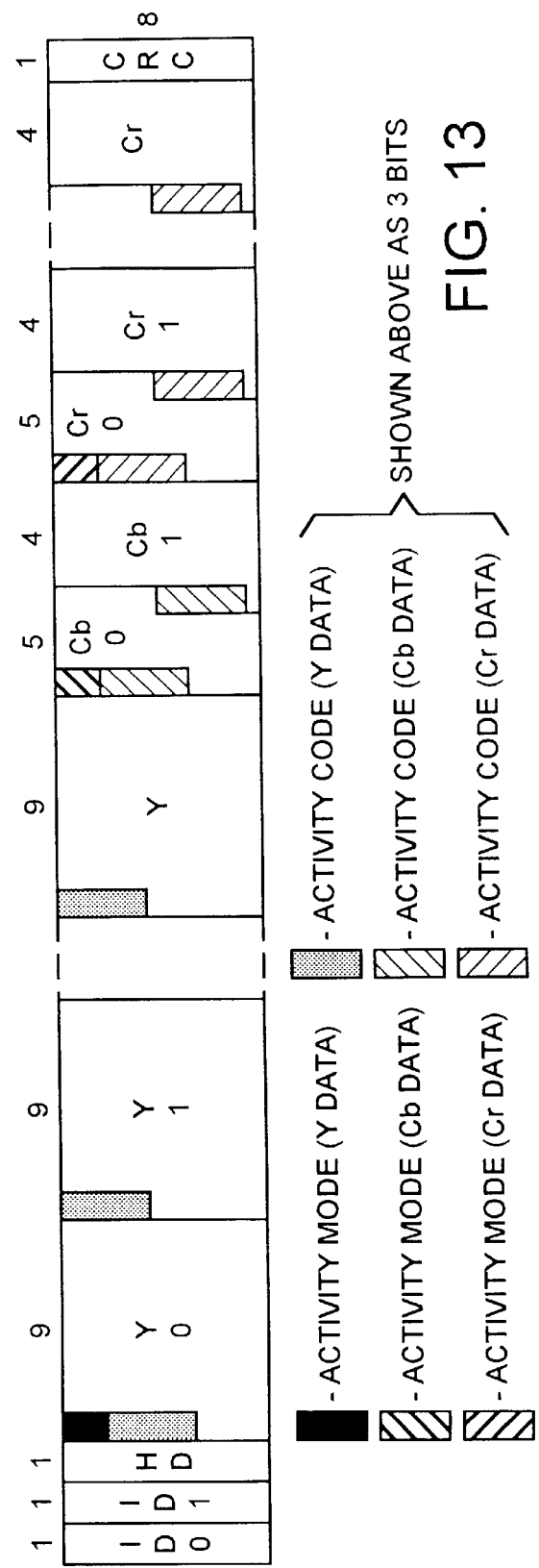
FIG. 12 schematically illustrates an optimisation process.

FIG. 12 is a table schematically illustrating the AC optimisation process. The left-hand column of FIG. 12 lists the initial AM value. If the maximum AC value detected by the maximum AC detector 442 is one of the values shown in the centre column, then the AM for that sync block can be replaced by the "optimised" AM shown in the right-hand column, and the ACs encoded using fewer bits. Over a whole sync block, the savings made by this technique can provide a considerable extra amount of data capacity for encoding the image data itself.

FIG. 13 schematically illustrates a sync block, showing header information ("ID0", "ID1", "HD"), luminance DCT blocks (Y0, Y1 . . . ), chrominance DCT blocks (Cb0, Cb1 . . . Cr0, Cr1 . . . ) and an error checking byte ("CRC"). The AMs for Y, Cb and Cr are specified separately, at the beginning of respective Y, Cb and Cr data sections of the sync block. The ACs for each Y, Cb and Cr DCT block are then specified at the beginning of that DCT block's data.

Although illustrative embodiments of the invention have been described in detail herein with reference to the accompanying drawings, it is to be understood that the invention is not limited to those precise embodiments, and that various changes and modifications can be effected therein by one skilled in the art without departing

We claim:

1. An image data compression apparatus for data compressing groups of data in accordance with a degree of data compression thereby generating groups of encoded image data representing respective sub-areas of an image, wherein said degree of data compression is modified at least in part by an attribute value representing image activity associated with said respective sub-areas, said apparatus comprising:

(i) a selection unit for selecting a respective attribute value to be associated with each sub-area of an image;

(ii) an attribute encoder for encoding a plurality of sets of attribute values representing levels of said image activity, wherein different sets of attribute values are allocated different respective quantities of data;

(iii) a detector for detecting whether a particular set of said attribute values for said sub-areas could be encoded with another of said sets of attribute codes allocated a smaller quantity of data; and (iv) a replacing unit responsive to said detector for replacing said particular set of attribute values for said sub-areas with said another set of attribute values allocated a smaller quantity of data.

2. Apparatus according to claim 1, in which said plurality of sets of attribute values comprises:

a master set of attribute values requiring the highest quantity of data; and one or more other sets of attribute values, each of said other sets representing attribute values which are a subset of the attribute values represented by said master set of attribute values.

3. Apparatus according to claim 1, in which said image activity of a sub-area of an image is dependent upon an amount of image detail in said sub-area of said image.

4. Apparatus according to claim 1, in which said image activity of a sub-area of an image is dependent upon an average luminance value of said sub-area of said image.

5. Apparatus according to claim 1, in which said image activity of a sub-area of an image is dependent upon an amount of a predetermined range of colour within said image.

6. Apparatus according to claim 5, in which said predetermined range of colours comprises colours associated with representations of human skin tones in said image.

7. Apparatus according to claim 1, comprising:

a spatial frequency transformer for transforming image data from each of said sub-areas of said image into corresponding spatial frequency coefficients; and a quantiser for quantising said spatial frequency coefficients.

8. Apparatus according to claim 7, in which said quantiser is operable to apply a degree of quantisation to spatial frequency coefficients derived from each said sub-area of said image dependent upon said attribute value associated with said sub-area of said image.

9. Apparatus according to claim 8, comprising an entropy encoder for entropy encoding said quantised spatial frequency coefficients.

10. The apparatus according to claim 1, wherein said encoding unit associates said plurality of sets of attribute values with respective quantisation offsets; further comprising a quantiser for quantising said sub-areas of said image using a base quantisation level and said quantisation offsets.

11. The apparatus according to claim 1, wherein said selection unit selects attribute modes representing a different set of attribute values, each attribute mode indicating said quantity of data; wherein said detecting unit detects whether a particular mode could be replaced with another mode allocated said smaller quantity of data.

12. The apparatus according to claim 11, wherein said detecting unit detects whether said particular set of attribute values is a subset of attribute values included in said particular mode such that said particular set of attribute values could be represented by said another mode; wherein replacing unit replaces said particular mode with said another mode.

13. The apparatus according to claim 10, wherein said quantiser trial quantises said sub-areas to determine said degree of compression independent of said image activity and final quantises said sub-areas according to said attribute values representing said image activity.

14. A method of image data compression for data compressing groups of data in accordance with a degree of data compression thereby generating groups of encoded image data representing respective sub-areas of an image, wherein said degree of data compression is modified at least in part by an attribute value representing image activity associated with said respective sub-areas, said method comprising the steps of:

(i) selecting a respective attribute value to be associated with each sub-area of an image;

(ii) encoding a plurality of sets of attribute values representing levels of said image activity, wherein different sets of attribute values are allocated different respective quantities of data;

(iii) detecting whether a particular set of said attribute values for said sub-areas could be encoded with another of said sets of attribute values a smaller quantity of data; and (iv) in response to a detection that said particular set of attribute values for said sub-areas could be encoded with said another set of attribute values allocated a smaller quantity of data, replacing said attribute values with said another set of attribute values.

15. The method according to claim 14, wherein said step of selecting said respective attribute value selects said attribute value in accordance with said image activity based on an image detail of said sub-areas.

16. The method according to claim 14, wherein said step of selecting said respective attribute value selects said attribute value in accordance with said image activity based on skin tone colours in said sub-areas.

17. The method according to claim 14, wherein said step of encoding associates said plurality of sets of attribute values with respective quantisation offsets; further comprising the step of quantising said sub-areas of said image using a base quantisation level and said quantisation offsets.

18. The method according to claim 17, further comprising the step of selecting attribute modes representing a different set of attribute values, each attribute mode indicating said quantity of data; wherein said step of detecting detects whether a particular mode could be replaced with another mode allocated said smaller quantity of data.

19. The method according to claim 18, wherein said step of detecting detects whether said particular set of attribute values is a subset of attribute values included in said particular mode such that said particular set of attribute values could be represented by said another mode; wherein said step of replacing replaces said particular mode with said another mode.

20. The method according to claim 17, wherein said step of quantising trial quantises said sub-areas to determine said degree of compression independent of said image activity and final quantises said sub-areas according to said attribute values representing said image activity.

\* \* \* \* \*